(12) United States Patent
Enzmann et al.

(10) Patent No.: US 7,664,493 B1
(45) Date of Patent: Feb. 16, 2010

(54) REDUNDANCY MECHANISMS IN A PUSH-TO-TALK REALTIME CELLULAR NETWORK

(75) Inventors: Mark J. Enzmann, Roswell, GA (US); Hung D. Hoang, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 432 days.

(21) Appl. No.: 11/382,564

(22) Filed: May 10, 2006

Related U.S. Application Data

(60) Provisional application No. 60/687,364, filed on Jun. 3, 2005.

(51) Int. Cl.
*H04W 24/00* (2009.01)
(52) U.S. Cl. ............... 455/424; 455/423; 455/422.1; 455/445; 455/450
(58) Field of Classification Search ......... 455/424, 455/423, 422.1, 445, 450
See application file for complete search history.

(56) References Cited

U.S. PATENT DOCUMENTS

| | | | |
|---|---|---|---|
| 5,983,260 A | 11/1999 | Hauser et al. | |
| 6,272,338 B1 | 8/2001 | Modzelesky et al. | |
| 6,529,731 B2 | 3/2003 | Modzelesky et al. | |
| 6,961,617 B1 * | 11/2005 | Snell | 607/30 |
| 7,013,139 B1 * | 3/2006 | Gan et al. | 455/432.3 |
| 7,079,857 B2 | 7/2006 | Maggenti et al. | |
| 7,082,130 B2 * | 7/2006 | Borella et al. | 370/389 |
| 7,289,613 B2 * | 10/2007 | Baker | 379/114.21 |
| 7,431,650 B2 * | 10/2008 | Kessman et al. | 463/42 |
| 2003/0053434 A1 | 3/2003 | Chow et al. | |
| 2005/0117725 A1 * | 6/2005 | Baker | 379/114.01 |
| 2005/0220288 A1 * | 10/2005 | Huey | 379/265.02 |
| 2005/0221819 A1 | 10/2005 | Krishnakant et al. | |
| 2006/0052130 A1 | 3/2006 | Choksi | |
| 2006/0063549 A1 | 3/2006 | Choksi | |
| 2007/0050262 A1 * | 3/2007 | Van Breemen et al. | 705/26 |
| 2007/0265064 A1 * | 11/2007 | Kessman et al. | 463/25 |

* cited by examiner

*Primary Examiner*—Joseph H Feild
*Assistant Examiner*—Huy D Nguyen

(57) ABSTRACT

Redundant mechanism in a push-to-talk (PTT) realtime architecture. Redundancy is provided in core delivery systems, which are employed for the emulation of "walkie-talkie" service with circuit switched duplex calls in the carrier network. The disclosed architecture provides for geographic and/or realtime mated redundancy. In one implementation, realtime redundancy is offered in an active-active scenario, although other scenarios are possible. Similarly, redundancy is provided in a roaming gateway implementation of the PTT network.

20 Claims, 12 Drawing Sheets

REDUNDANCY MECHANISMS IN A PUSH-TO-TALK REALTIME CELLULAR NETWORK

CROSS-REFERENCE TO RELATED APPLICATIONS

This is an application claiming the benefit under 35 U.S.C. §119(e) of U.S. Provisional Patent Application Ser. No. 60/687,364 entitled "REDUNDANCY MECHANISMS IN A PUSH-TO-TALK REALTIME CELLULAR NETWORK" which was filed Jun. 3, 2005. The entirety of which is incorporated by reference herein.

BACKGROUND OF THE INVENTION

Walkie-talkies are far and away the most convenient type of radio communications system for a quick exchange of information. A user pushes the button and is in instant communication with one or a whole group of contacts. Due to the speed and convenience of this technology, telecommunications carriers have incorporated this technology into cellular technology for use with mobile handsets.

Accordingly, push-to-talk (PTT) is a two-way communications method integrated into cellular technology that uses half-duplex mode where transmission occurs in both directions, but not at the same time. To use PTT, users must press a button on the PTT device while speaking, then release it when done. The listener must then do the same to respond. A typical PTT session can last about 20 to 30 seconds, versus roughly 3 minutes for a traditional cellular call.

However, the integration of PTT technology and cellular technology has not been seamless. Among other issues, telecommunications carriers have been plagued with reliability and efficiency concerns due to the integration of the PTT and cellular technology. Reliability of PTT technology has been addressed in a variety of ways, but to date, very few telecommunications carriers provide a reliable and efficient PTT service for their cellular networks. Typically, the PTT technology can be constructed with internal redundancy, however, the PTT technology does not have a provision for geographic or realtime mated redundancy.

Accordingly, there exists a demand for improved reliability and efficiency, such as geographic or realtime mated redundancy, for PTT service on cellular networks.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation facilitates a redundant core delivery system for the emulation of "walkie-talkie" (or push-to-talk (PTT)) service with circuit switched duplex calls in a circuit-switched carrier network. The disclosed architecture provides for geographic and/or realtime mated redundancy. In one implementation, realtime redundancy is offered in an active-active scenario, although other scenarios are possible. This maintains the existing hardware footprint and reduces the footprint from a proposed convention N+1 configuration. Conventionally, in this one example, three active hardware components are implemented with one non-traffic bearing (or standby) unit.

The subject innovation provides, in an active-active scenario, the same four chassis, but in two mated and redundant configurations. Since all four units can now have an identical chassis configuration, they can also all be traffic-bearing units. Accordingly, if either of the pair member units fails to function, then all originated calls will continue to be handled in the network by the geographically diverse mate unit. At the time of recovery of the failed mated unit, a database associated with the failed unit now being brought back online, can be utilized to update from the live (active) database of the operational mate. The mated unit will receive updates for new customers from its mate concurrent with all other updates to the database. Thus, a record can be made instantly available at the mate during event failure scenarios in the network.

In order for two units to act in a mated active-active configuration, an interconnection is provided to facilitate communication therebetween to ensure that hosted subscriber databases are kept in synchronization with one another. Additionally, this communication interconnection can use the same realtime communications as the link provided in a conventional N+1 configuration, thereby reducing or eliminating entirely any need by technicians to physically reconfigure the existing systems.

A core memory level of the pair units will be sufficiently substantial to maintain 100% of the subscriber base. If needed, an additional memory card can be inserted into the existing single chassis to expand its memory capacity.

The traffic distribution between the mated pair systems can be distributed by both a STP (signal transfer point) and the originating MSC (mobile switching center), or either unit individually. This can also push the availability for the platform beyond the 99.998% level.

Provisioning for the active-active mated pair can be identical to the current provisioning scheme utilizing an EMS (element management system). The EMS can also run in a configuration that allows for provisioning to the mated units so as to maintain customer convenience.

In another aspect thereof, redundancy is provided in a roaming gateway implementation of the PTT network.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
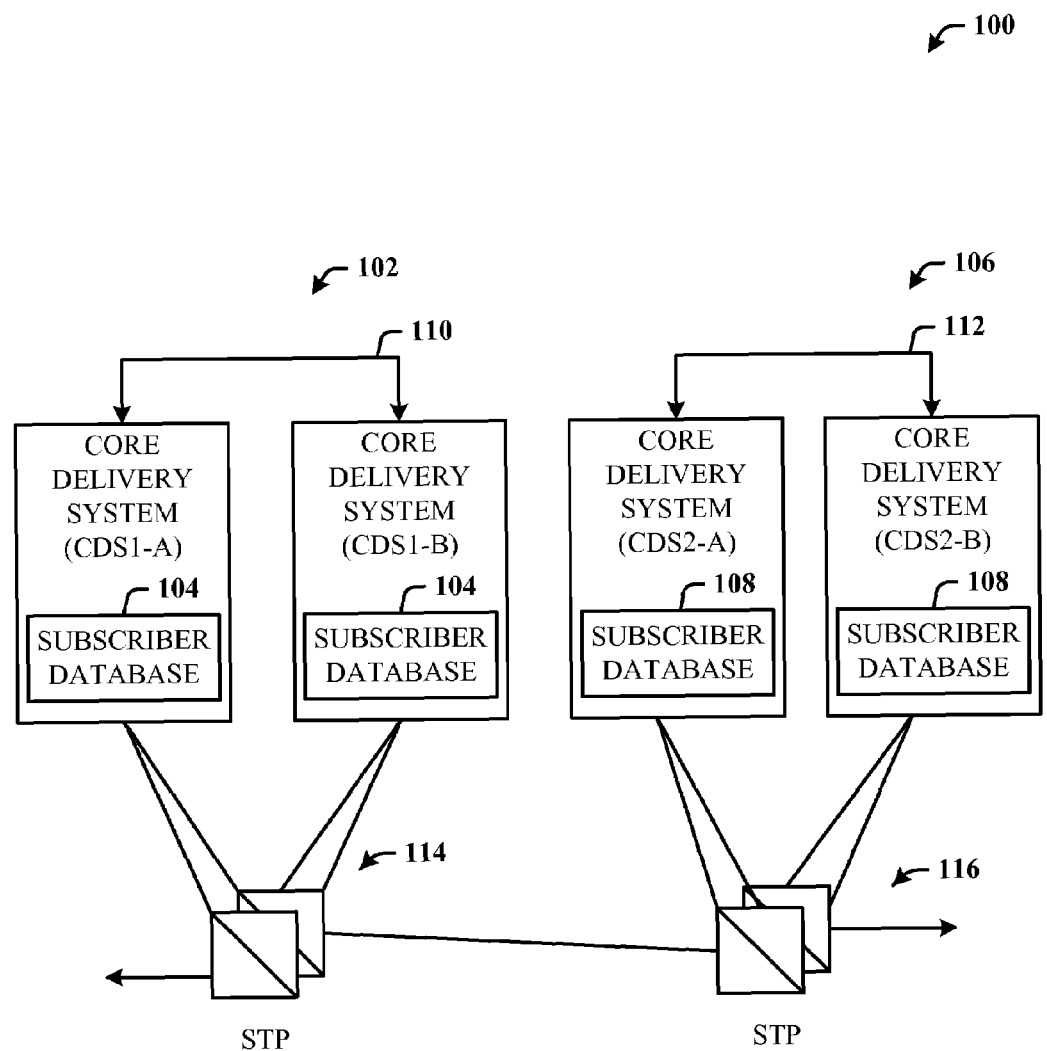
FIG. 1 illustrates a system of redundant packet core delivery subsystems in accordance with the subject innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, a cellular network hardware or software entity (e.g., a switch or a router), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 of redundant core delivery systems in accordance with the subject innovation. Conventionally in IP-centric networks, such systems employ an N+1 configuration, where there can be, for example, three active units, and a fourth standby (passive or non-traffic bearing) unit, that is readily available for use in case one of the first three units goes offline due to failure or other problems. Whereas, in accordance with the invention, there are provided mated pairs of redundant core delivery systems configured in an active-active configuration. In other words, there is not a single standby unit for the other traffic-bearing units. A mated pair comprises two fully operational traffic-bearing units connected to provide full synchronization of the onboard subscriber database.

Since all four units are traffic bearing, each can have an identical single chassis configuration. In order for the units to act in a mated active-active configuration, the mated pair communicates in order to ensure the subscriber database is kept in synchronization. This communication uses the identical near realtime communications interface as provided in an N+1 configuration. It is to be understood that more units can be implemented according to the needs of the particular application.

Additionally, the core memory level of the mated pair is substantially sufficient to maintain 100% of the subscriber base. If needed, an additional memory card (not shown) can be inserted into the existing pair member unit to expand its memory capacity.

The traffic distribution between the pair can be distributed by both a signal transfer point (STP) and the originating mobile switching center (MSC), or either unit individually. This can also push the availability for the platform beyond the 99.998% level. Accordingly, if either of the pair member units fails to function while in the active-active configuration, all originated calls will continue to be handled in the network by the geographically diverse mate unit.

Here, there are provided two mated pairs of units in an active-active configuration. A first mated pair 102 includes a first core delivery system (denoted CDS1-A) and a second core delivery system (denoted CDS1-B), each hosting the same first subscriber database 104. Similarly, the system 100 includes a second mated pair 106 having a first core delivery system (denoted CDS2-A) and a second core delivery system (denoted CDS2-B), each hosting the same subscriber database 108, but which can be different from the first subscriber database 104. Alternately, both mated pairs (102 and 106) can host the same subscriber database, such that if one mated unit fails, voice traffic is not interrupted, since the second mated unit is fully operational and with the same subscriber data as the first mated unit. The core delivery systems can handle IP packets, non-IP based data, or both.

Further, the first mated pair 102 is interconnected via a first pair connection 110, and the second mated pair 106 is interconnected via a second pair connection 112. The interconnections (110 and 112) can be IP data connections or any other connections that facilitate at least database synchronization between the pair member units and failure detection by one unit or the other. Generally, the interconnections (110 and 112) facilitate redundancy communications between each mated pair.

In this implementation, the environment in which the system 100 is employed carries non-packet realtime telecommunications voice traffic, where guaranteed signal delivery is required. In operation, if the first member unit CDS1-A goes offline to signaling but does not fail its voice connections, voice traffic is not interrupted, since the second member unit CDS1-B is fully operational and with the same subscriber data (via synchronization) as the first member unit CDS1-A, all new originating calls are handled without interruption. The second member unit CDS1-B operates and updates its database. When the first member unit CDS1-A comes back online, the first and second units 102 initialize communications between each other, and prior to handling traffic, will perform database synchronization. That is, the first unit CDS1-A updates its database 104 from the database 104 of the second unit CDS1-B. Once fully synchronized, the first unit CDS1-A is then placed back into full service. It is also to be appreciated that these units can be geographically diverse. That is, the first member unit CDS1-A can be deployed in another city or state from the second member unit CDS1-B.

As illustrated in FIG. 1, the first mated pair 102 interfaces to a mated pair of STP units 114 which operate according to the SS7 (Signaling System 7) signaling architecture (e.g., Telcordia standards GR-246-CORE and GR-82-CORE for ANSI networks). An STP is a packet switch, and is the signaling router in the SS7 network. It transfers messages that use the same national standard of protocol (e.g., Telcordia GR-246-CORE for ANSI networks, Q.703 and Q.704 for ITU networks). Similarly, the second mated pair 106 interfaces to a mated pair of STP units 116 which operate according to the SS7 signaling architecture. Accordingly, the first mated pair 102 interfaces to the second mated pair 106 via two mated pairs of STP units (114 and 116) which operate according to SS7 signaling architecture to control traffic distribution between the first and second mated pairs (102 and 106).

Figure 2:
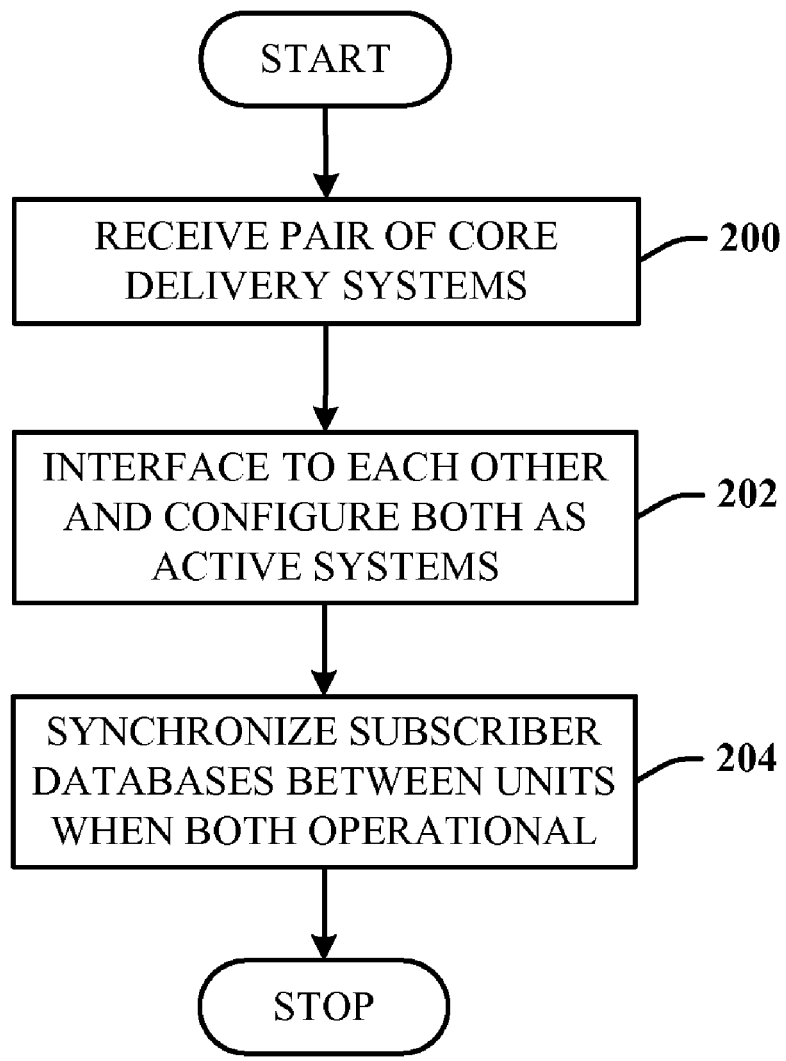
FIG. 2 illustrates a methodology of providing redundancy in realtime voice delivery system according to an aspect.

FIG. 2 illustrates a methodology of providing redundancy in realtime voice delivery system according to an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a pair of redundant core delivery systems is provided. The pair of redundant core delivery systems each hosts at least one subscriber database. As both units share a synchronization link, the redundant core delivery systems will have identical subscriber data. At 202, the two units are interfaced and configured as active-active traffic-bearing units. It is noted that the subject innovation is not limited to active-active applications, but can be implemented in other environments such as active-passive, passive-active, active-passive-passive, active-active-passive, and so on. At 204, once operationally interfaced, the mated pair synchronizes subscriber databases. This can occur on a regular basis, for example, as each unit updates it own database, it sends data to the other. It is to be appreciated however; the units can synchronize databases on a periodic basis, and/or at times when network traffic is not so busy, for example.

Figure 3:
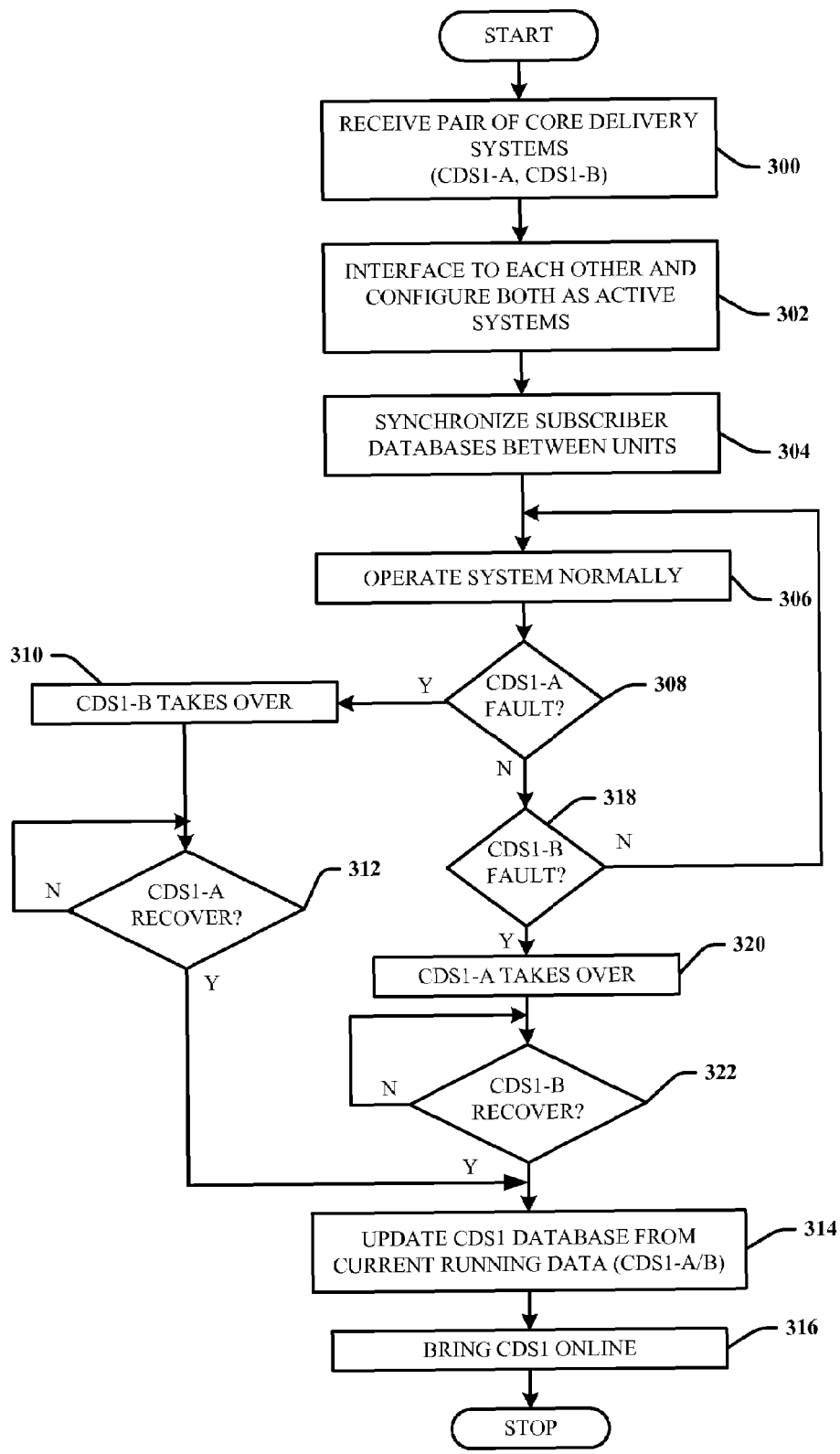
FIG. 3 illustrates a methodology of synchronizing databases in a failure mode in accordance with another aspect.

Referring now to FIG. 3, there is illustrated a methodology of synchronizing databases in a failure mode in accordance with another aspect. At 300, a pair of redundant core delivery systems is received for implementation. As stated supra, the pair of redundant core delivery systems each hosts at least one subscriber database. At 302, the units are interfaced to each other and configured, in one implementation, as active-active units. At 304, initial database synchronization can occur, although this is not required. As both units share a synchronization link, the redundant core delivery systems will have identical subscriber data within each subscriber database. At 306, the system operates normally. At 308, the system checks for unit failures. If no failure is detected, flow is back to 306 wherein the system continues to operate normally and continues to perform system checks for unit failures.

If a failure has been detected, flow is from 308 to 310 (or 318 to 320) where the second member unit of the redundant core delivery systems takes over for the failed unit. This includes processing the traffic of the failed unit, in addition to its own traffic. At 312 (or 322), the system checks to determine if the failed unit is back online or another operational unit is operationally available (via replacement or repair, for example). If not, flow loops back to 312 (or 322) wherein the system continues to operate without the failed unit and continues to perform system checks to determine if the failed unit is back online. If the failed unit is back online via replacement or repair, etc., at 314, the newly operational unit synchronizes its database with the operational member unit. Once fully synchronized, at 316, the new unit is placed back into service and its load is offloaded from the other member unit to the new unit, thereby preventing loss or interruption of voice traffic.

Figure 4:
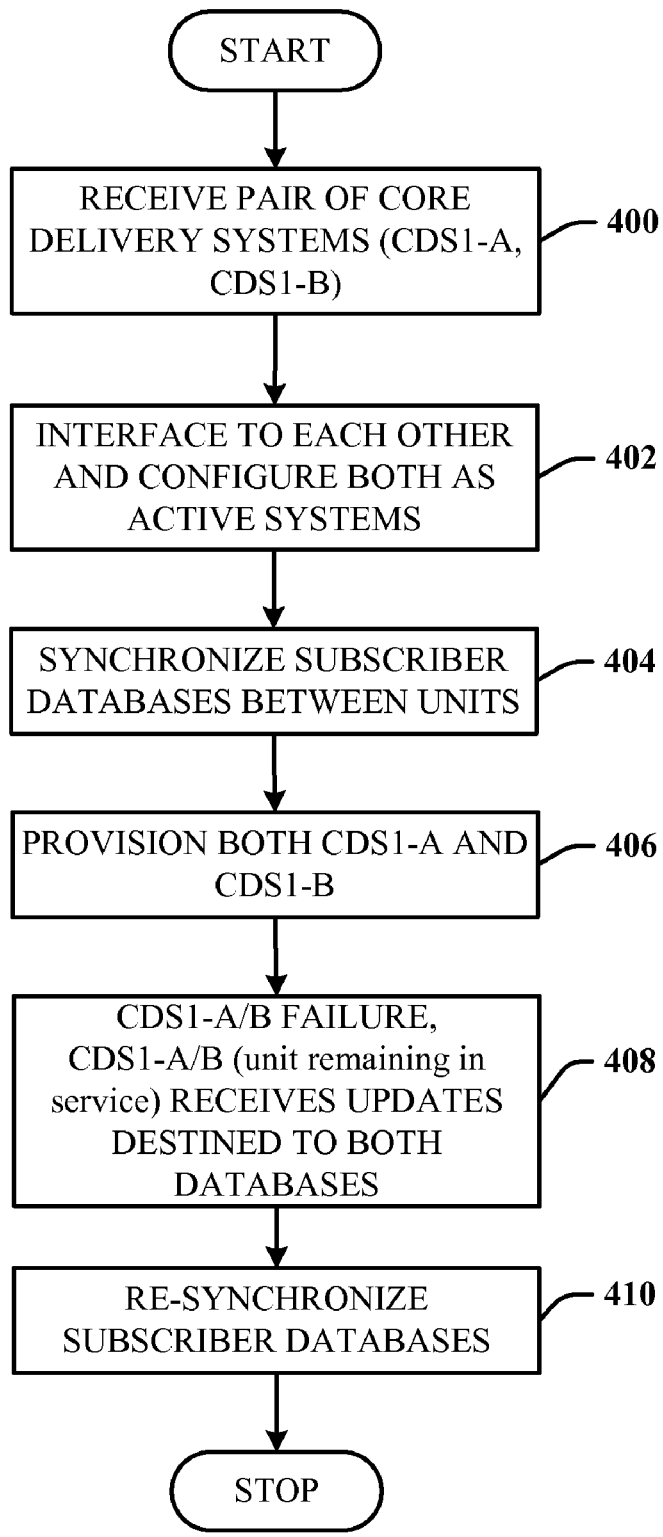
FIG. 4 illustrates a methodology of provisioning in accordance with another aspect of the innovation.

FIG. 4 illustrates a methodology of provisioning in accordance with another aspect of the innovation. At 400, a pair of redundant core delivery systems is provided. As stated supra, the pair of redundant core delivery systems each hosts at least one subscriber database. At 402, the two units are interfaced and configured as active-active traffic-bearing units. At 404, once operationally interfaced, the mated pair synchronizes subscriber databases. As both units share a synchronization link, the redundant core delivery systems will have identical subscriber data within each subscriber database. At 406, both mated units are provisioned. Generally, provisioning for the active-active mated pair can be identical to the current provisioning scheme utilizing an EMS (element management system). The EMS can also run in a configuration that allows for provisioning to the mated units so as to maintain customer convenience. Further, at 408, if one of the core delivery systems fails, the remaining operational unit will take over traffic processing for both units and will receive updates destined to both subscriber databases. At 410, once the failed unit is back on-line (repaired), the mated pair synchronizes subscriber databases. At the time of recovery of the failed mate, the database would update from the live (active) database on the operational mate. The mated unit will receive updates for new customers from its mate, concurrent with all other updates to the database. Thus, provisioning of the active-active mated pair allows an instantly available record at the mate during event failure scenarios in the network.

Figure 5:
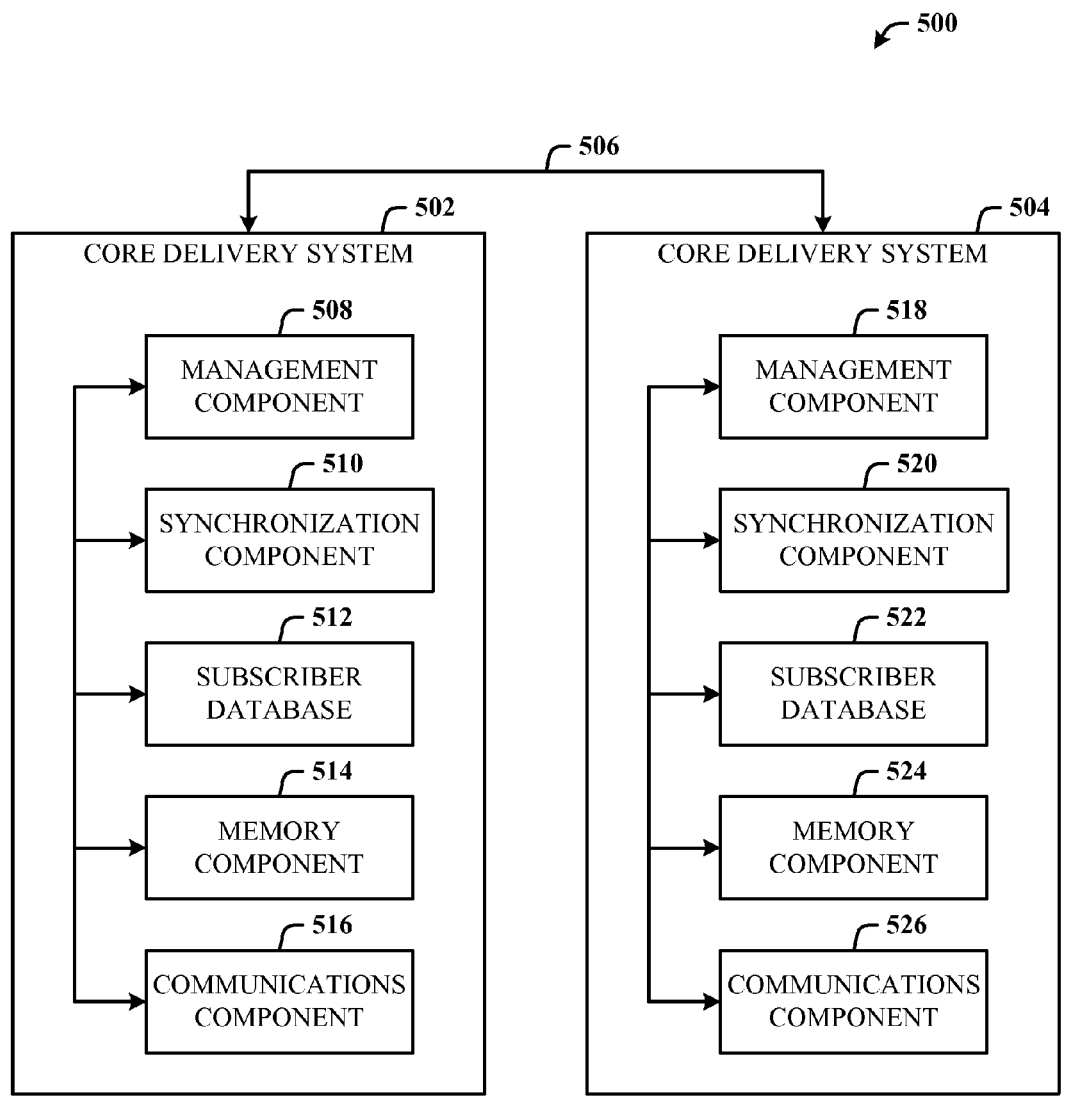
FIG. 5 illustrates a schematic block diagram of a system of mated pair of packet core delivery systems.

FIG. 5 illustrates a schematic block diagram of a system 500 of a mated pair of core delivery systems. A first unit 502 is mated to a second unit 504 for redundant signal processing in an SS7 architecture. The first and second units (502 and 504) are interconnected via a communications connection 506 that supports at least failure detection of one unit or the other, and database synchronization of the associated subscriber databases. The first unit 502 can include a management component 508 that facilitates management of some or all processing of the first unit 502. A synchronization component 510 that facilitates data synchronization of a first unit subscriber database 512, such that the subscriber databases (512 and 522) contain the same subscriber data when both core delivery systems (502 and 504) are operational. A memory 514 (e.g., a cache memory) of the first unit 502 is provided for fast data processing, and for storing temporarily programs and/or data that is cached for high speed execution. The memory 514 is sized according to the anticipated traffic and according to synchronization needs, for example. A communications component 516 facilitates the interface to the STP entities for at least traffic routing and handling. Note that communications that can occur across the interconnection 506 can also be facilitated via the communications component 516, as well as routing and handling that occurs to the STP units.

Similarly, the second unit 504 can include a management component 518 that facilitates management of some or all processing of the second unit 504. A synchronization component 520 that facilitates data synchronization of the second unit subscriber database 522, such that the subscriber databases (512 and 522) contain the same subscriber data when both core delivery systems (502 and 504) are operational. A memory 524 (e.g., a cache memory) of the second unit 504 is provided for fast data processing, and for storing temporarily programs and/or data that is cached for high speed execution. The memory 524 is sized according to the anticipated traffic and according to synchronization needs, for example. A communications component 526 facilitates the interface to the STP entities for at least routing and handling.

Figure 6:
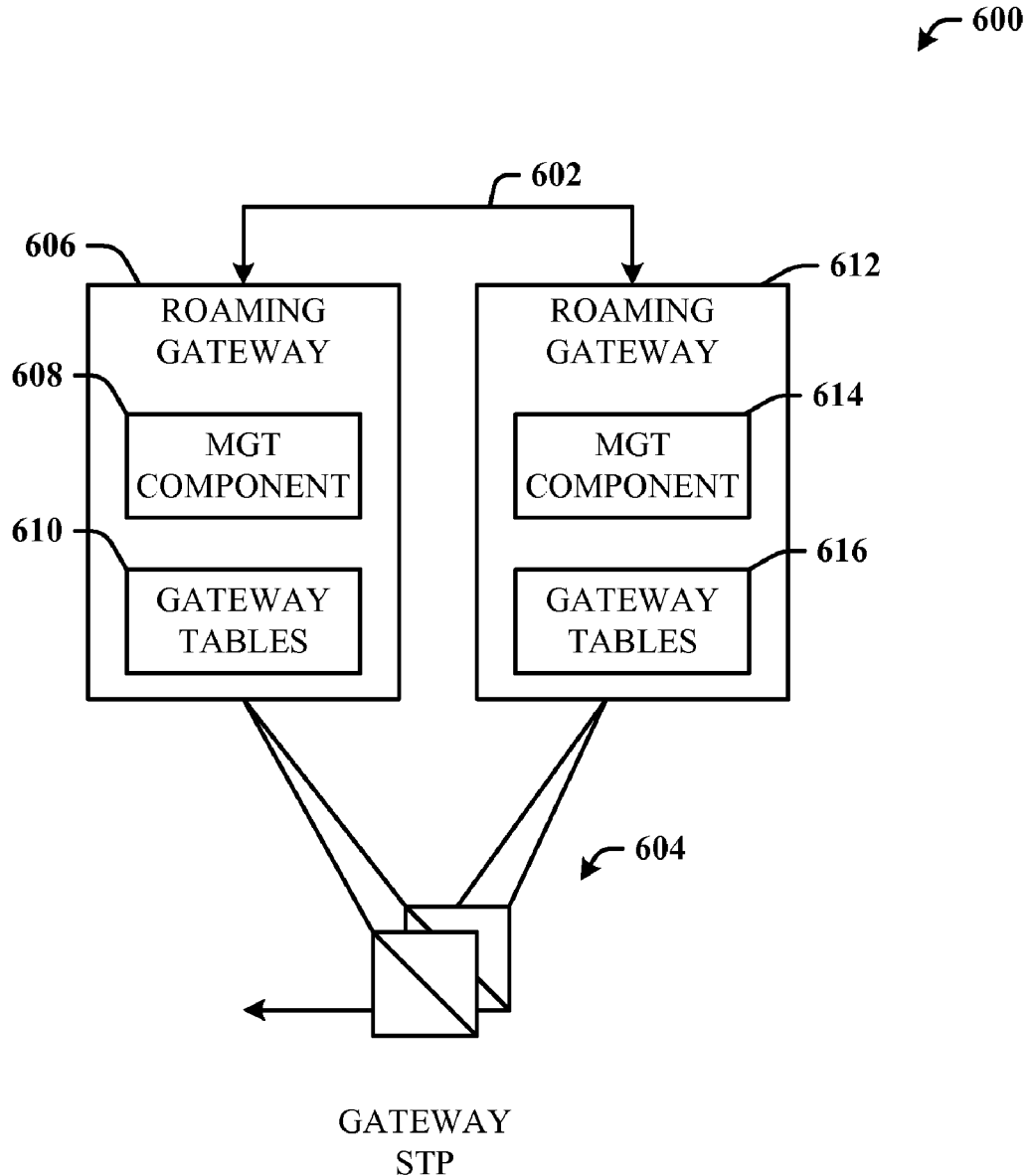
FIG. 6 illustrates a system of redundant roaming gateways in accordance with the disclosed innovation.

Referring now to FIG. 6, there is illustrated a system of redundant roaming gateways in accordance with the disclosed innovation. Similar to the redundancy of the core delivery systems described supra, the roaming gateways can be interconnected to provide true redundancy. Thus, there is provided a mated pair of roaming gateways 600 which are interconnected by a communications connection 602 to facilitate redundancy communications. The first pair member 606 can include a management component 608 that facilitates management of some or all processing of the first pair member 606. Gateway tables 610 can be created for storing relationships of information. All information coming in to the gateway that references a desired connection to an outgoing network can be stored in the gateway table(s) as a record. Thus, owners of the gateway can monitor the gateway table(s) to see where the traffic is coming from and going. Accordingly, the gateway table(s) maps one incoming address to an outgoing address (i.e., address translation) between different networks.

Similarly, the second pair member 612 can include a management component 614 that facilitates management of some or all processing of the second pair member 612. Gateway tables 616 can be included for storing relationships of information and thus, enabling owners of the gateway to monitor traffic between different networks. Furthermore, each of the pair members (606 and 612) connects redundantly to a mated pair of gateway STP devices 604 to facilitate redundancy in traffic distribution between the first and second mated pair members (606 and 612).

Figure 7:
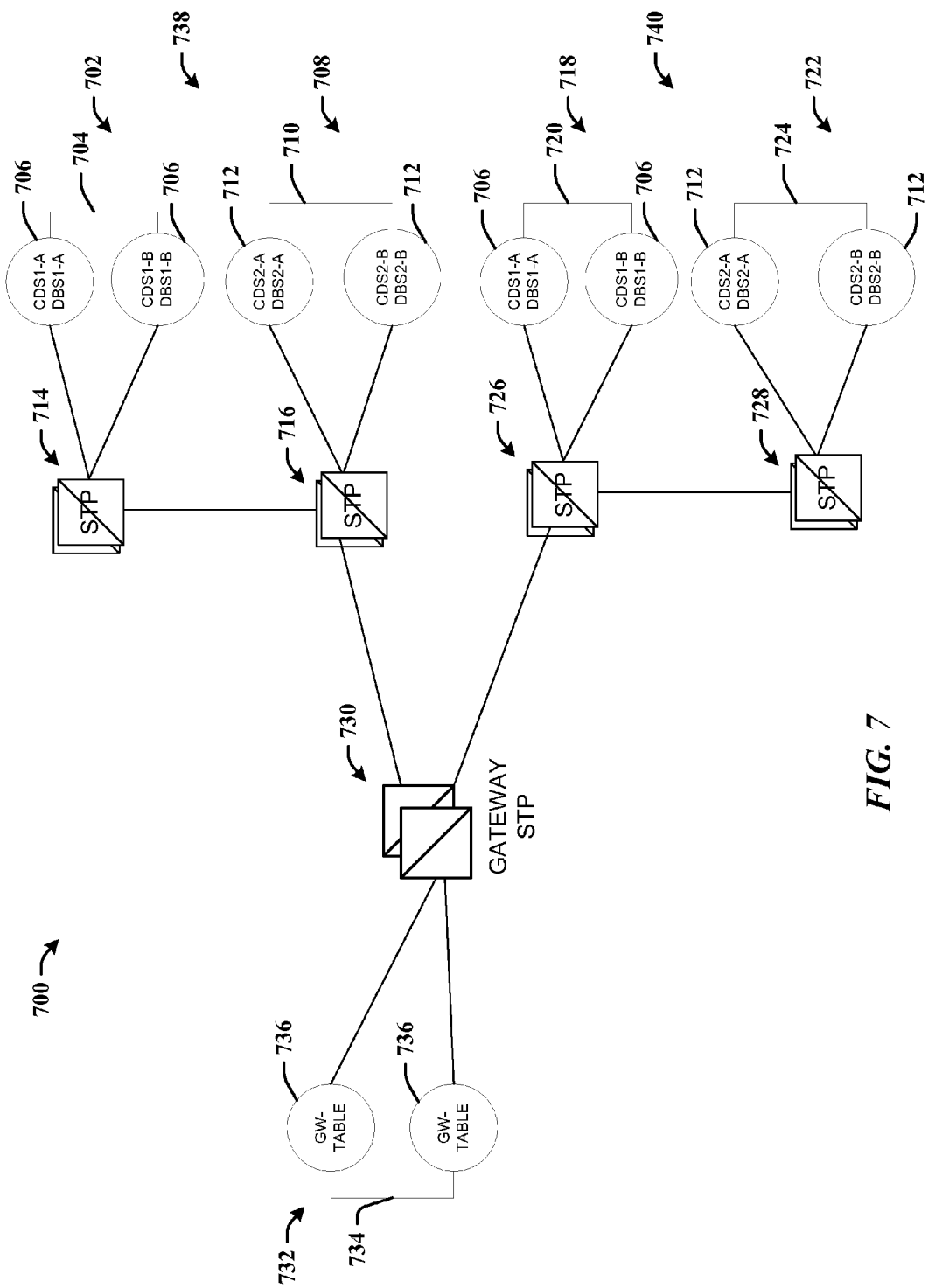
FIG. 7 illustrates a network that employs packet core delivery system redundancy in another aspect.

FIG. 7 illustrates a network 700 that employs core delivery system redundancy in another aspect. Here, there are provided two redundant sets of two mated pairs of units in an active-active configuration. In the first set 738, a first mated pair 702 includes a first core delivery system (denoted CDS1-A) and a second core delivery system (denoted CDS1-B), each hosting the same first subscriber database 706 (denoted DBS1-A and DBS1-B). Similarly, the system 700 includes a second mated pair 708 having a first core delivery system (denoted CDS2-A) and a second core delivery system (denoted CDS2-B), each hosting the same subscriber database 712 (denoted DBS2-A and DBS2-B), but which is different from the first subscriber database 706. The core delivery systems can handle IP packets, non-IP based data, or both.

Further, the first mated pair 702 is interconnected via a first pair connection 704, and the second mated pair 708 is interconnected via a second pair connection 710. The interconnections (704 and 710) can be IP data connections or any other connections that facilitate at least database synchronization between the pair member units and failure detection by one unit or the other.

In this implementation, the environment in which the system 700 is employed carries non-packet realtime telecommunications voice traffic, where guaranteed signal delivery is required. In operation, if the first member unit CDS1-A goes offline to signaling but does not fail its voice connections, voice traffic is not interrupted, since the second member unit CDS1-B is fully operational and with the same subscriber data (via synchronization) as the first member unit CDS1-A, all new origins are handled without interruption. The second member unit CDS1-B operates and updates its database. When the first member unit CDS1-A comes back online, the first and second units initialize communications between each other, and prior to handling traffic will perform database synchronization. That is, the first unit updates its database from the database of the second unit. Once fully synchronized, the first unit is then placed back into full service. It is also to be appreciated that these units are geographically diverse. That is, the first member unit CDS1-A can be deployed in another city or state from the second member unit CDS1-B.

As illustrated in FIG. 7, the first mated pair 702 of the first set 738 interfaces to a mated pair of STP units 714 which operate according to the SS7 (Signaling System 7) signaling architecture (Telcordia standards GR-246-CORE and GR-82-CORE for ANSI networks). The second mated pair 708 of the first set 738 interfaces to a separate mated pair of STP units 716 which operate according to the SS7 signaling architecture. Accordingly, the first mated pair 702 interfaces to the second mated pair 708 via two mated pairs of STP units (714 and 716) which operate according to SS7 signaling architecture to control traffic distribution between the first and second mated pairs (702 and 708) of the first set 738.

Furthermore, the system 700 includes a second set 740 completely redundant to the first set 738. The second set 740 includes a first mated pair 718 that includes a first core delivery system (denoted CDS1-A) and a second core delivery system (denoted CDS1-B), each hosting the same first subscriber database 706 (denoted DBS1-A and DBS1-B) as in the redundant first mated pair 702 of first set 738. Similarly, the second set 740 includes a second mated pair 722 having a first core delivery system (denoted CDS2-A) and a second core delivery system (denoted CDS2-B), each hosting the same subscriber database 712 (denoted DBS2-A and DBS2-B) as in the redundant second mated pair 708 of first set 738. Accordingly, both sets (738 and 740) are completely redundant and can host the same subscribe databases (706 and 712), such that if one complete mated unit (e.g., 702) fails, voice traffic is not interrupted, since the second complete mated unit (718) is fully operational and with the same subscriber data as the first complete mated unit (702).

As further illustrated in FIG. 7, the first mated pair 718 of the second set 740 interfaces to a mated pair of STP units 726 which operate according to the SS7 signaling architecture. The second mated pair 722 of the second set 740 interfaces to a separate mated pair of STP units 728 which operate according to the SS7 signaling architecture. Accordingly, the first mated pair 718 interfaces to the second mated pair 722 via two mated pairs of STP units (726 and 728) which operate according to SS7 signaling architecture to control traffic distribution between the first and second mated pairs (718 and 722) of the second set 740.

Additionally, the mated pairs of STP units (714 and 716; 726 and 728) interface with a mated pair of Gateway STP units 730. The mated pair of Gateway STP units 730 interfaces with a pair of roaming gateways 732 to facilitate traffic distribution between different networks. Similar to the redundancy of the core delivery systems described supra, the roaming gateways can be interconnected to provide true redundancy. Thus, there is provided a pair of roaming gateways 732 which are interconnected by a communications connection 734 to facilitate redundancy communications. Gateway tables 736 (denoted GW-TABLE) can be included for storing relationships of information and thus, enabling owners of the gateway to monitor traffic between the different networks. Accordingly, the gateway table(s) 736 maps one incoming address to an outgoing address (i.e., address translation) between different networks.

Figure 8:
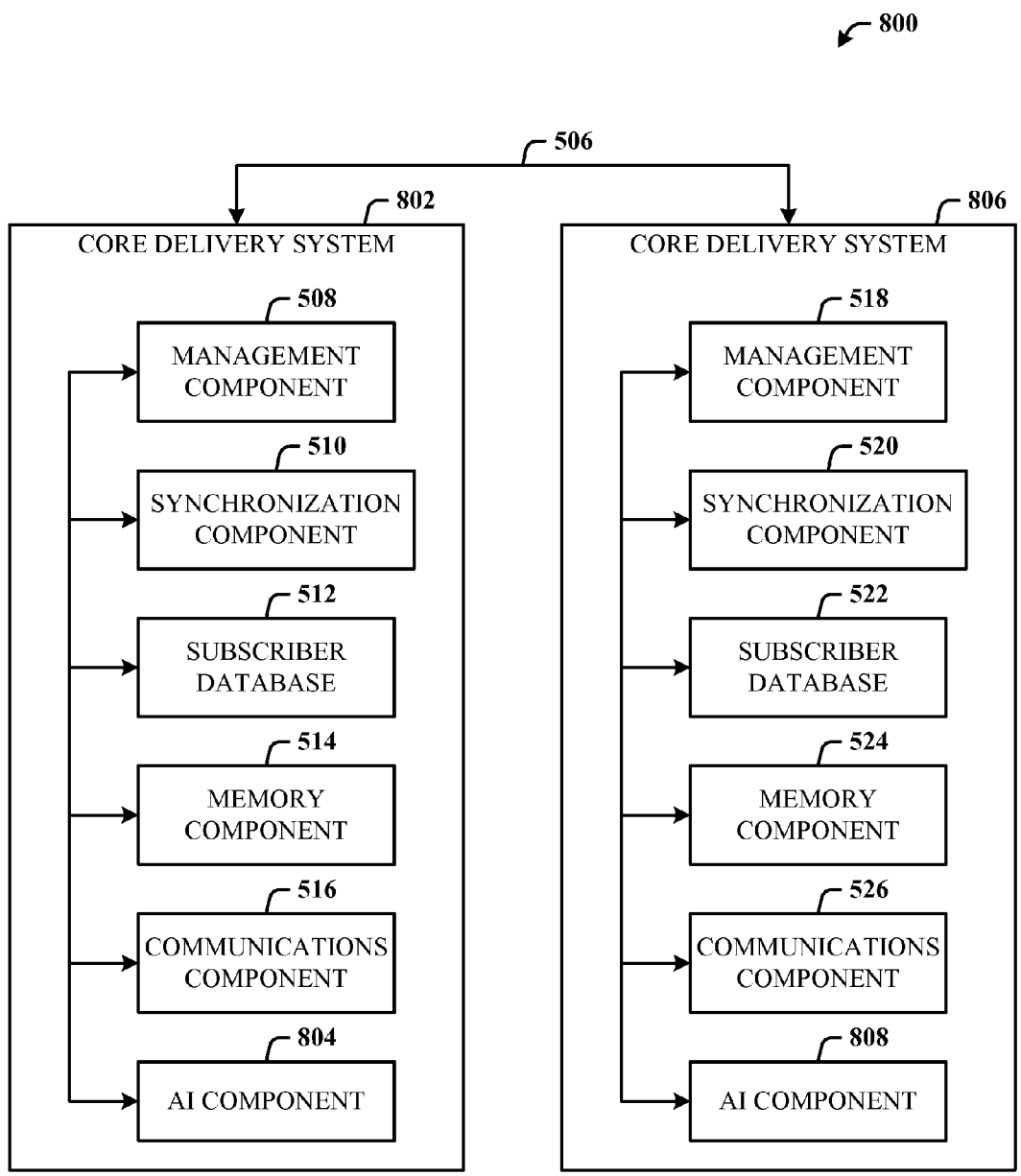
FIG. 8 illustrates a redundant packet core delivery system that employs an artificial intelligence which facilitates automating one or more features in accordance with the subject innovation.

FIG. 8 illustrates a mated pair system 800 that employs an artificial intelligence (AI) which facilitates automating one or more features in accordance with the subject innovation. Here, a first member unit 802 of the pair can include the components of FIG. 5: the management component 508, the synchronization component 510, the subscriber database 512, the memory component 514, and the communications component 516. Additionally, the first unit 802 includes an AI component 804. Similarly, the system 800 includes a second member unit 806, which can include the following components of FIG. 5: the management component 518, the synchronization component 520, the subscriber database 522, the memory component 524, and the communications component 526. Additionally, the second member unit 806 can include an AI component 808.

The subject innovation (e.g., in connection with selection) can employ various AI-based schemes for carrying out various aspects thereof. For example, a process for determining when to perform database synchronization can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including but not limited to determining when to initiate database synchronization of a failed pair member that is now operational. Additionally, the AI component 802 can be employed to determine how long synchronization can take, and based on that information, when to perform synchronization. For example, if the traffic is heavy, is may be desirable to delay synchronization to a time when traffic is not so heavy. This can be learned based on historical data. If the traffic historically is less later at night, synchronization may be performed more often, while during heavy traffic times, it is performed less often. These are just a few examples of how the AI components (802 and 804) can be configured and employed.

Figure 9:
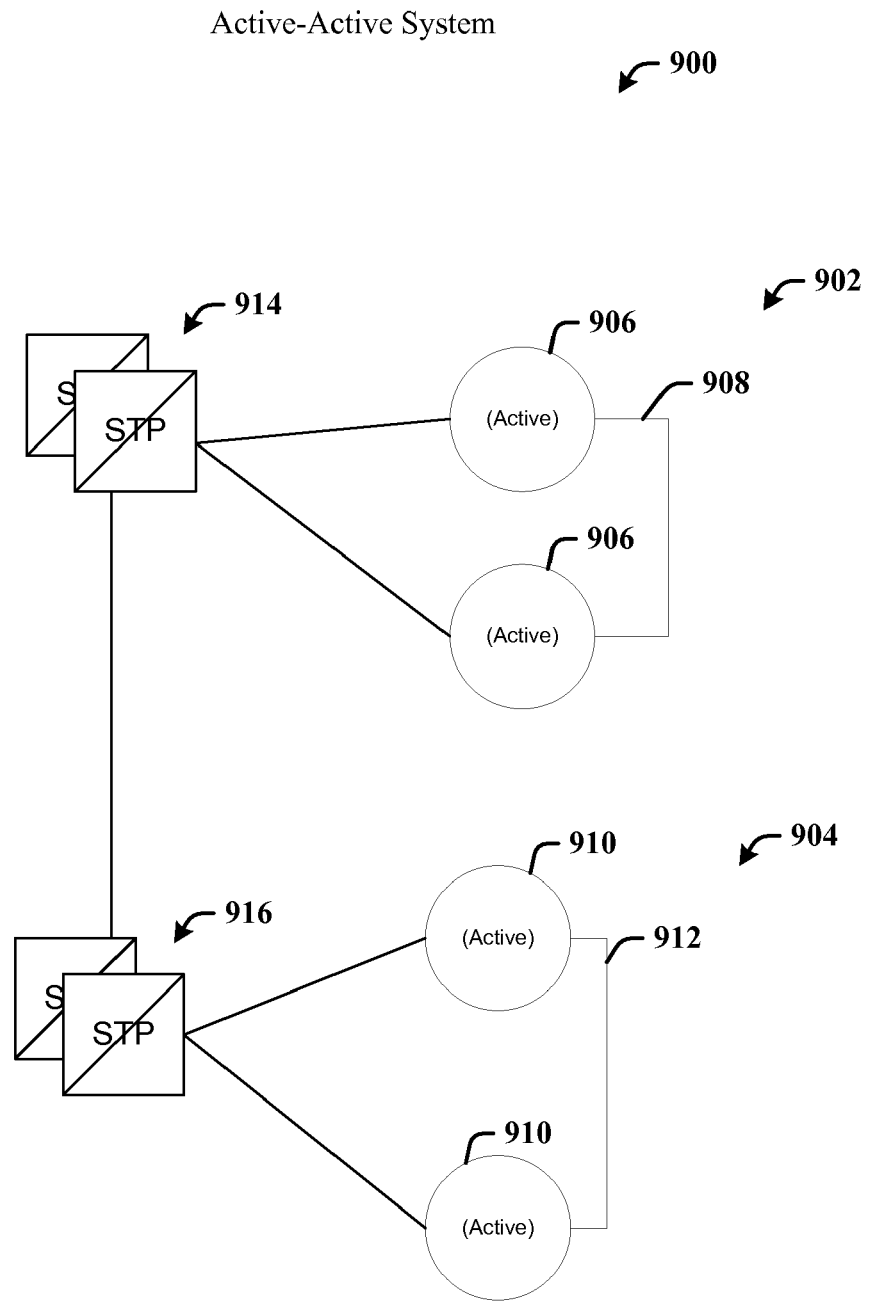
FIG. 9 illustrates an active-active configuration that utilizes two STP pairs according to an aspect.

FIG. 9 illustrates an active-active configuration that utilizes two mated STP pairs according to an aspect. In this configuration 900, two sets of mated device pairs (902 and 904) are shown. The first mated pair 902 hosts the same first subscriber data 906. As both units share a synchronization link 908, the first mated pair 902 will have identical subscriber data. Similarly, the system 900 includes a second mated pair 904 that hosts the same second subscriber data 910, but which is different from the first subscriber data 906. As both units share a synchronization link 912, the second mated pair 904 will have identical subscriber data. The synchronization links (908 and 912) can be IP data connections that facilitate at least database synchronization between the pair member units and failure detection by one unit or the other.

Further, the first mated pair 902 interfaces to a mated pair of STP units 914 which operate according to the SS7 signaling architecture. The second mated pair 904 interfaces to a separate mated pair of STP units 916 which operate according to the SS7 signaling architecture. Accordingly, the first mated pair 902 interfaces to the second mated pair 904 via two mated pairs of STP units (914 and 916) which operate according to SS7 signaling architecture to control traffic distribution between the first and second mated pairs (902 and 904). SS7 signaling between the mated pairs (902 and 904) is carried out by way of STP units 914 connecting to STP units 916. Each of the STPs is, in actuality, a pair of STP units. This provides each STP installation with load-sharing and backup capabilities. Thus the links shown in FIG. 9 as being connected to an STP are, in actuality, divided between the two STP units of an STP pair (914 and 916). The addition of two mated pairs of STP units (914 and 916) operates to more efficiently control traffic distribution between the first and second mated pairs (902 and 904) and provides additional redundancy and load-sharing capabilities as compared to just one mated pair of STP units.

In operation, the loss of one member of the mated pair 902 (going offline) will cause a reroute of services to the remaining member. Since both units share a synchronization link 908, they will both have identical subscriber data 906. The data 906 can be stored in high speed memory (e.g., volatile or non-volatile) and/or RAM drive or other suitable high-speed storage and access subsystem. The second member unit operates and updates its subscriber data 906. When the first member unit comes back online, the first and second units initialize communications between each other, and prior to handling traffic will perform data synchronization. Note that in this configuration, only the loss of the mated pair (e.g., 902 or 904) will result in loss of service.

Figure 10:
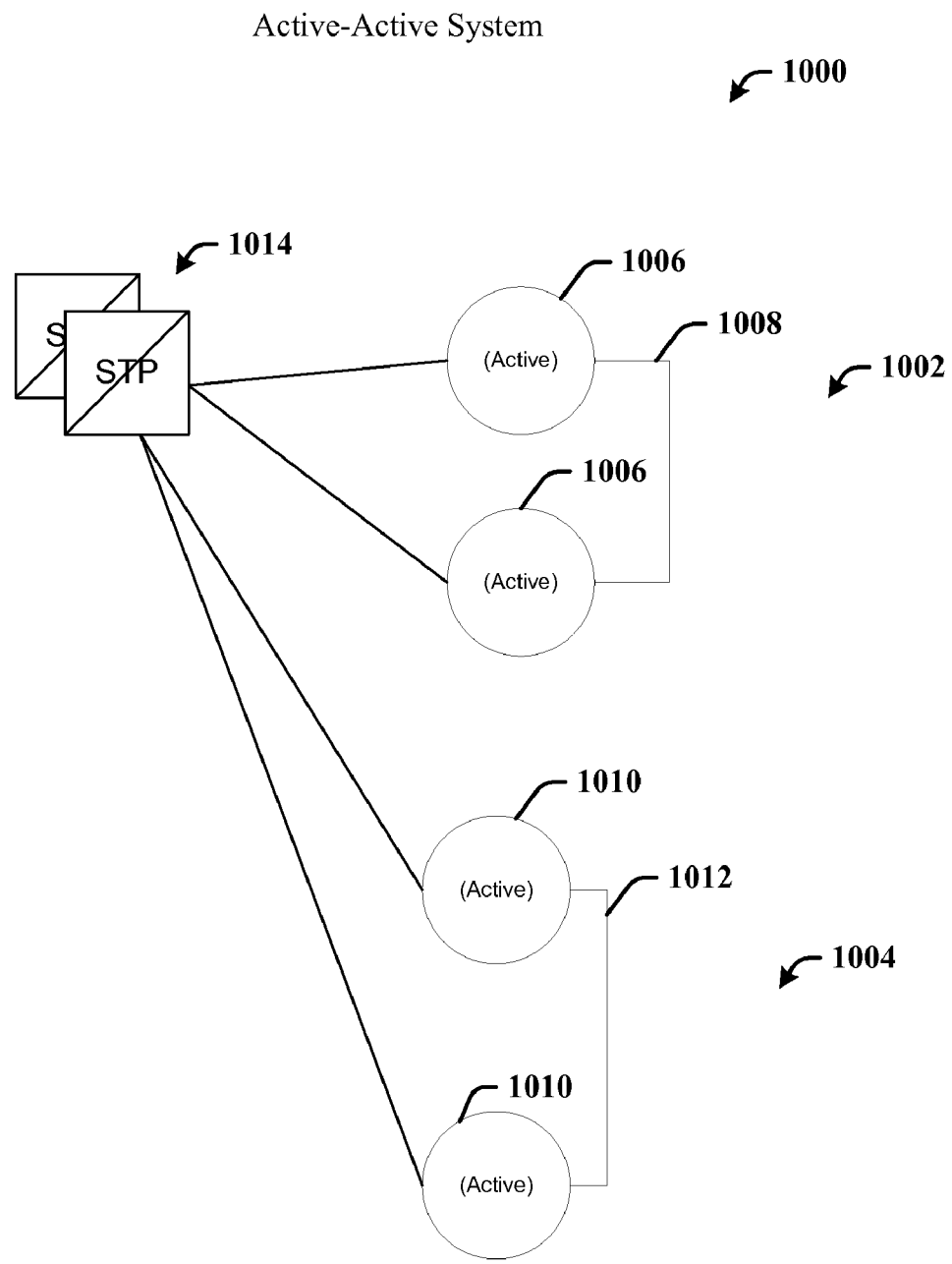
FIG. 10 illustrates an active-active configuration that utilizes a single STP pair according to an aspect.

FIG. 10 illustrates an active-active configuration that utilizes a single STP pair according to an aspect. In this configuration 1000, two sets of mated device pairs (1002 and 1004) are shown. The first mated pair 1002 hosts the same first subscriber data 1006. As both units share a synchronization link 1008, the first mated pair 1002 will have identical subscriber data. Similarly, the system 1000 includes a second mated pair 1004 that hosts the same second subscriber data 1010, but which is different from the first subscriber data 1006. As both units share a synchronization link 1012, the second mated pair 1004 will have identical subscriber data. The synchronization links (1008 and 1012) can be IP data connections that facilitate at least database synchronization between the pair member units and failure detection by one unit or the other.

Further, both the first and second mated pairs (1002 and 1004) interface to a mated pair of STP units 1014 which operate according to the SS7 signaling architecture to control traffic distribution between the first and second mated pairs (1002 and 1004). SS7 signaling between the mated pairs (1002 and 1004) is carried out by way of STP units 1014, which is, in actuality, a pair of STP units. This provides each STP installation with load-sharing and backup capabilities. Thus, the links shown in FIG. 10 as being connected to an STP are, in actuality, divided between the two STP units of an STP pair 1014. Accordingly, it is also possible to use the active-active configuration with only a single pair of STP units 1014, as opposed to the two pairs of STP units (914 and 916) illustrated in FIG. 9.

In operation, the loss of one member of the mated pair 1002 (going offline) will cause a reroute of services to the remaining member. Rerouting of services to the operational member due to a failure of the other mated member is automatic. Since both units share a synchronization link 1008, they will both have identical subscriber data 1006. The second member unit operates and updates its subscriber data 1006. When the first member unit comes back online, the first and second units initialize communications between each other, and prior to handling traffic will perform data synchronization. Again, only the loss of a mated pair (e.g., 1002 or 1004) will results in loss of service. In contrast, a conventional N+1 configuration to a single STP pair would require manual intervention of redirection to the inactive member unit.

Figure 11:
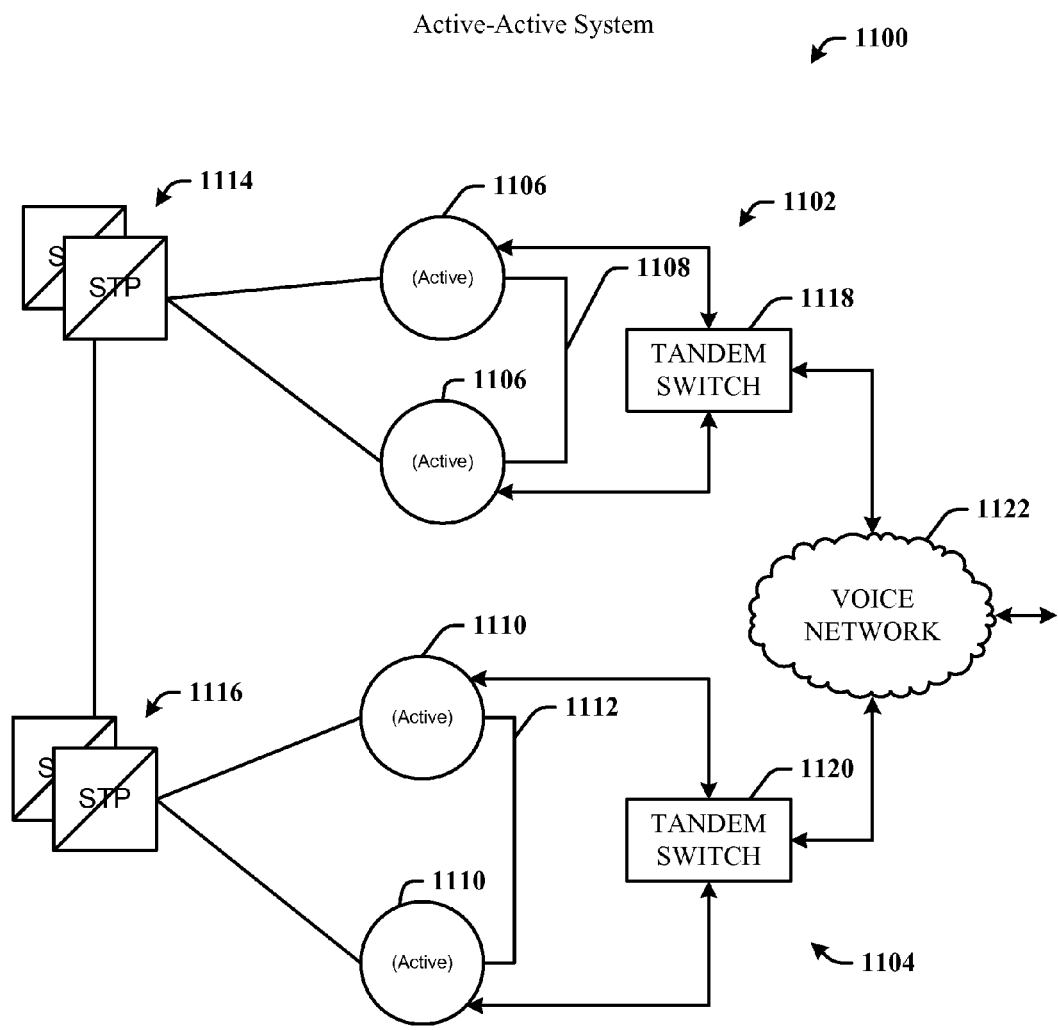
FIG. 11 illustrates an active-active configuration that utilizes two STP pairs and corresponding tandem switches for interfacing voice traffic to corresponding redundant mated pairs according to an aspect.

FIG. 11 illustrates an active-active configuration that utilizes two STP pairs and tandem switches for interfacing voice traffic to the corresponding redundant mated pairs according to an aspect. In this configuration 1100, two sets of mated device pairs (1102 and 1104) are shown. The first mated pair 1102 hosts the same first subscriber data 1106. As both units share a synchronization link 1108, the first mated pair 1102 will have identical subscriber data. Similarly, the system 1100 includes a second mated pair 1104 that hosts the same second subscriber data 1110, but which is different from the first subscriber data 1106. As both units share a synchronization link 1112, the second mated pair 1104 will have identical subscriber data. The synchronization links (1108 and 1112) can be IP data connections that facilitate at least database synchronization between the pair member units and failure detection by one unit or the other.

In the configuration 1100, the two sets of mated device pairs (1102 and 1104) interface with tandem switches (1118 and 1120). Specifically, the first mated pair 1102 interfaces with tandem switch 1118, which in turn interfaces with the voice network 1122. Tandem switch 1118 acts to route voice data to and from the voice network 1122 to the member units of the first mated pair 1102. Similarly, the second mated pair 1104 interfaces with tandem switch 1120, which in turn interfaces with the voice network 1122. Tandem switch 1120 acts to route voice data to and from the voice network 1122 to the member units of the second mated pair 11104.

Further, the first mated pair 1102 interfaces to a mated pair of STP units 1114 which operate according to the SS7 signaling architecture. The second mated pair 1104 interfaces to a separate mated pair of STP units 1116 which operate according to the SS7 signaling architecture. Accordingly, the first mated pair 1102 interfaces to the second mated pair 1104 via two mated pairs of STP units (1114 and 1116) which operate according to SS7 signaling architecture to control traffic distribution between the first and second mated pairs (1102 and 1104). SS7 signaling between the mated pairs (1102 and 1104) is carried out by way of STP units 1114 connecting to STP units 1116. Each of the STPs is, in actuality, a pair of STP units. This provides each STP installation with load-sharing and backup capabilities. Thus the links shown in FIG. 11 as being connected to an STP are, in actuality, divided between the two STP units of an STP pair (1114 and 1116). The addition of two mated pairs of STP units (1114 and 1116) operates to more efficiently control traffic distribution between the first and second mated pairs (1102 and 1104) and provides additional redundancy and load-sharing capabilities as compared to just one mated pair of STP units.

In operation, the loss of one member of the mated pair 1102 (going offline) will cause a reroute of services to the remaining member. Since both units share a synchronization link 1108, they will both have identical subscriber data 1106. The data 1106 can be stored in high speed memory (e.g., volatile or non-volatile) and/or RAM drive or other suitable high-speed storage and access subsystem. The second member unit operates and updates its subscriber data 1106. When the first member unit comes back online, the first and second units initialize communications between each other, and prior to handling traffic will perform data synchronization. Note that in this configuration, only the loss of the mated pair (e.g., 1102 or 1104) will result in loss of service.

Figure 12:
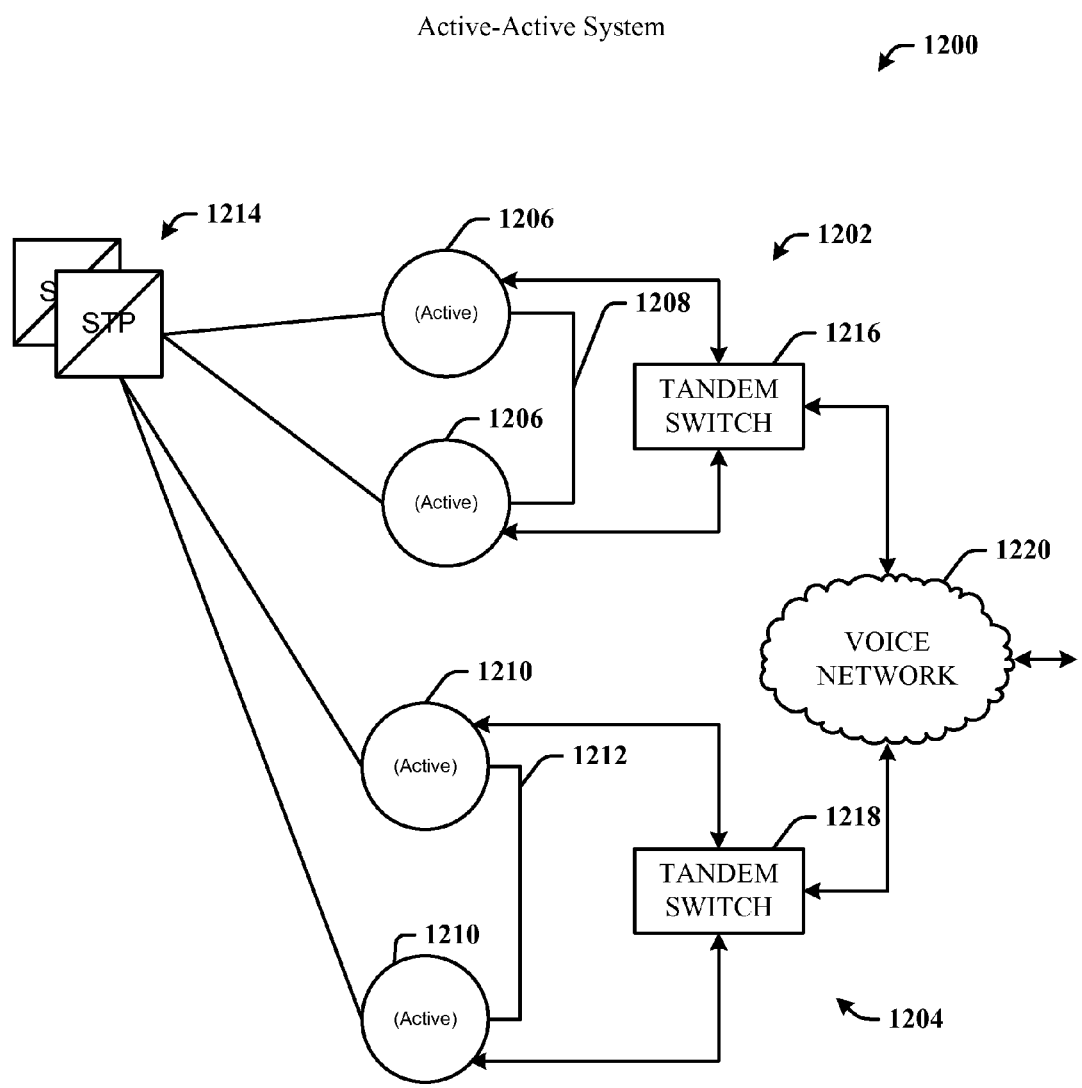
FIG. 12 illustrates an active-active configuration that utilizes a single STP pair and corresponding tandem switches for interfacing voice traffic to corresponding redundant mated pairs according to an aspect.

FIG. 12 illustrates an active-active configuration that utilizes a single STP pair and tandem switches for interfacing voice traffic to the corresponding redundant mated pairs according to an aspect. In this configuration 1200, two sets of mated device pairs (1202 and 1204) are shown. The first mated pair 1202 hosts the same first subscriber data 1206. As both units share a synchronization link 1208, the first mated pair 1202 will have identical subscriber data. Similarly, the system 1200 includes a second mated pair 1204 that hosts the same second subscriber data 1210, but which is different from the first subscriber data 1206. As both units share a synchronization link 1212, the second mated pair 1204 will have identical subscriber data. The synchronization links (1208 and 1212) can be IP data connections that facilitate at least database synchronization between the pair member units and failure detection by one unit or the other.

In the configuration 1200, the two sets of mated device pairs (1202 and 1204) interface with tandem switches (1216 and 1218). Specifically, the first mated pair 1202 interfaces with tandem switch 1216, which in turn interfaces with the voice network 1220. Tandem switch 1216 acts to route voice data to and from the voice network 1220 to the member units of the first mated pair 1202. Similarly, the second mated pair 1204 interfaces with tandem switch 1218, which in turn interfaces with the voice network 1220. Tandem switch 1218 acts to route voice data to and from the voice network 1220 to the member units of the second mated pair 1204.

Further, both the first and second mated pairs (1202 and 1204) interfaces to a mated pair of STP units 1214 which operate according to the SS7 signaling architecture to control traffic distribution between the first and second mated pairs (1202 and 1204). SS7 signaling between the mated pairs (1202 and 1204) is carried out by way of STP units 1214, which is, in actuality, a pair of STP units. This provides each STP installation with load-sharing and backup capabilities. Thus, the links shown in FIG. 12 as being connected to an STP are, in actuality, divided between the two STP units of an STP pair 1214. Accordingly, it is also possible to use the active-active configuration and tandem switches with only a single pair of STP units 1214, as opposed to the two pairs of STP units (1114 and 1116) illustrated in FIG. 11.

In operation, the loss of one member of the mated pair 1202 (going offline) will cause a reroute of services to the remaining member. Rerouting of services to the operational member due to a failure of the other mated member is automatic. Since both units share a synchronization link 1208, they will both have identical subscriber data 1206. The second member unit operates and updates its subscriber data 1206. When the first member unit comes back online, the first and second units initialize communications between each other, and prior to handling traffic will perform data synchronization. Again, only the loss of a mated pair (e.g., 1002 or 1004) will results in loss of service. In contrast, a conventional N+1 configuration to a single STP pair would require manual intervention of redirection to the inactive member unit.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data communication, comprising:
    a first redundant core delivery system that processes and delivers data related to realtime voice over a cellular carrier; and
    a second redundant core delivery system that interconnects to the first core delivery system such that stored data can be synchronized therebetween;
    wherein the first and second core delivery systems are configured in an active-active configuration;
    wherein if the first redundant core delivery system fails, services associated with the first redundant core delivery system are managed by the second redundant core delivery system such that if the first redundant core delivery system is restored after failure, the services associated with the first redundant core delivery system are automatically rerouted to the first redundant core delivery system from the second redundant core delivery system.

2. The system of claim 1, wherein the stored data exists in a first subscriber database of the first redundant core delivery system and a second subscriber database of the second redundant core delivery system.

3. The system of claim 2, wherein the first and second subscriber databases are synchronized.

4. The system of claim 1, wherein restoration of the first redundant core delivery system after failure thereof causes a first subscriber database associated therewith to automatically synchronize with a second subscriber database of the second redundant core delivery system.

5. The system of claim 1, further comprising an artificial intelligence component that employs a probabilistic and/or statistical-based analysis to prognose or infer an action that a user desires to be automatically performed.

6. The system of claim 1, wherein the first and second redundant core delivery systems form a first mated pair.

7. The system of claim 6, further comprising a second mated pair of first and second redundant core delivery systems that interface to the first mated pair via a mated pair of STP (signal transfer point) units which operate according to SS7 (Signaling System 7) signaling architecture to control traffic distribution between the first and second mated pairs.

8. The system of claim 7, wherein the first and second mated pairs utilize two mated pairs of STP units which operate according to SS7 signaling architecture to control traffic distribution between the first and second mated pairs.

9. The system of claim 8, further comprising at least one tandem switch that interfaces voice traffic to the first and second mated pairs.

10. The system of claim 8, wherein the first and second mated pairs are grouped as separate physical modules and configured in a redundant, active-active configuration.

11. The system of claim 7, wherein the first and second mated pairs utilize an originating MSC (mobile switching center) to control traffic distribution between the first and second mated pairs.

12. The system of claim 7, wherein the first and second mated pairs utilize both a mated pair of STP units and an MSC to control traffic distribution between the first and second mated pairs.

13. A system that facilitates data communication, comprising:
    a first roaming gateway system for processing and delivery of data related to realtime voice over a cellular carrier; and
    a second roaming gateway system interconnected to the first roaming gateway system in an active-active configuration such that the second roaming gateway system automatically handles the services of the first roaming gateway system when the first roaming gateway system fails;
    wherein the first and second roaming gateway systems connect redundantly to a mated pair of gateway STP devices to control traffic distribution between the first and second roaming gateway systems.

14. The system of claim 13, wherein each of the first and second roaming gateway systems include gateway tables that store a map from each incoming address to an outgoing address between different networks.

15. A method that facilitates data communication, comprising:
    generating a first redundant core delivery system that processes and delivers data relating to realtime voice over a cellular carrier, wherein the data is stored in a first subscriber database of the first core redundant delivery system;
    generating a second redundant core delivery system that interconnects to the first redundant core delivery system, the second redundant core delivery system comprises a second subscriber database of stored data;
    interfacing both the first and second core delivery systems to each other;
    configuring the first and second redundant core delivery systems in an active-active configuration;
    synchronizing the first and second subscriber databases when both the first and second core delivery systems are operational;
    identifying a failure in either the first core delivery system or second core delivery system, wherein if a failure of the first core delivery system is identified, re-routing services associated with the first core delivery system to the second core delivery system;
    restoring the first core delivery system after failure thereof;
    re-routing services from the second core delivery system back to the first core delivery system; and
    re-synchronizing the first and second subscriber databases.

16. The method of claim 15, further comprising:
configuring the first and second redundant core delivery systems to form a first mated pair;
generating a second mated pair of first and second redundant core delivery systems;
interfacing the first mated pair and second mated pair via a mated pair of STP (signal transfer point) units which operate according to SS7 (Signaling System 7) signaling architecture.

17. The method of claim 16, further comprising:
utilizing an originating MSC (mobile switching center) to control traffic distribution between the first and second mated pairs.

18. The method of claim 16, further comprising:
utilizing the mated pair of STP units to control traffic distribution between the first and second mated pairs.

19. The method of claim 16, further comprising:
utilizing the mated pair of STP units and an MSC (mobile switching center) to control traffic distribution between the first and second mated pairs.

20. The method of claim 15, further comprising:
inferring a user desired action that a user desires to be automatically performed based upon a probabilistic and/or statistical-based analysis;
performing the user desired action automatically.

* * * * *